United States Patent
Lazzarini et al.

(10) Patent No.: US 10,617,131 B2
(45) Date of Patent: Apr. 14, 2020

(54) MACHINE FOR MAKING LIQUID OR SEMI-LIQUID PRODUCTS EQUIPPED WITH FIELDBUS CONTROLLED INVERTER

(71) Applicant: ALI GROUP S.r.l.—CARPIGIANI, Cernusco sul Naviglio (IT)

(72) Inventors: Roberto Lazzarini, Reggio Emilia (IT); Andrea Cocchi, Calderara di Reno (IT)

(73) Assignee: ALI GROUP S.R.L.—CARPIGIANI, Cernusco Sul Naviglio (IT)

( * ) Notice: Subject to any disclaimer, the term of this patent is extended or adjusted under 35 U.S.C. 154(b) by 0 days.

(21) Appl. No.: 14/947,418

(22) Filed: Nov. 20, 2015

(65) Prior Publication Data
US 2016/0150804 A1 Jun. 2, 2016

(30) Foreign Application Priority Data
Nov. 28, 2014 (IT) .............................. BO2014A0670

(51) Int. Cl.
*A23G 9/22* (2006.01)
*A23G 9/12* (2006.01)
(Continued)

(52) U.S. Cl.
CPC .............. *A23G 9/228* (2013.01); *A23G 9/04* (2013.01); *A23G 9/12* (2013.01); *A23G 9/22* (2013.01);
(Continued)

(58) Field of Classification Search
CPC . A23G 9/228; A23G 9/04; A23G 9/12; A23G 9/22; A23G 9/28; A23G 9/48;
(Continued)

(56) References Cited

U.S. PATENT DOCUMENTS 4,703,628 A * 11/1987 Togashi ................. A23G 9/163
222/55
5,829,224 A * 11/1998 Sizer ........................ A23L 3/22
53/127
(Continued)

FOREIGN PATENT DOCUMENTS

| CN | 101607531 A | 12/2009 |
|---|---|---|
| CN | 102299535 A | 12/2011 |

(Continued)

OTHER PUBLICATIONS

Italian Search Report dated Aug. 13, 2015 from related Italian Patent Application No. IT BO20140670.
(Continued)

*Primary Examiner* — Ibrahime A Abraham
*Assistant Examiner* — Chris Q Liu
(74) *Attorney, Agent, or Firm* — Shuttleworth & Ingersoll, PLC; Timothy J. Klima

(57) ABSTRACT

A machine for making liquid and semi-liquid products includes a container for processing the products, a mixer operating inside the container, a heat exchanger, operatively associated with the container for exchanging heat with the product inside the container, a motor driving the mixer, and an inverter, connected to the motor for controlling operation of the motor. A control and operating unit, connected to the inverter sends command signals and receives control signals. A communication fieldbus, interposed between the inverter and the control unit allows transmission of the signals. The control unit is programmed to run a first algorithm of the state machine type configured to control the inverter, include the following states: transmission of a command to the inverter, standby for confirmation that the inverter received the command, transmission of a read
(Continued)

request for an inverter operating parameter, standby for receiving the inverter parameter.

8 Claims, 3 Drawing Sheets

(51) Int. Cl.
| | | |
|---|---|---|
| *B01F 15/00* | (2006.01) | |
| *B01F 15/06* | (2006.01) | |
| *B01F 7/16* | (2006.01) | |
| *B01F 3/08* | (2006.01) | |
| *A23G 9/28* | (2006.01) | |
| *B01F 7/04* | (2006.01) | |
| *A23G 9/04* | (2006.01) | |
| *B01F 7/00* | (2006.01) | |
| *B01F 13/10* | (2006.01) | |

(52) U.S. Cl.
 CPC ............ *A23G 9/28* (2013.01); *B01F 3/0853* (2013.01); *B01F 7/00583* (2013.01); *B01F 7/04* (2013.01); *B01F 7/162* (2013.01); *B01F 13/1027* (2013.01); *B01F 15/00201* (2013.01); *B01F 15/00253* (2013.01); *B01F 15/065* (2013.01)

(58) Field of Classification Search
 CPC .......... A23G 9/045; A23G 9/20; A23G 9/281; A23G 9/282; A23G 9/44; A23G 9/46; A23G 9/08; A23G 9/086; A23G 9/163; A23G 9/225; A23G 9/245; A23G 9/32; A23G 9/52; B01F 3/0853; B01F 7/00583; B01F 7/04; B01F 7/162; B01F 13/1027; B01F 15/00201; B01F 15/00253; B01F 15/065; B01F 15/00175; B01F 15/00207; B01F 7/18
 USPC ..... 99/455, 453, 452, 459, 470, 443 C, 467, 99/485; 426/660, 100, 303, 306, 515, 426/520, 521, 524, 93, 101, 102, 231, 426/237, 238, 244, 302, 305, 309, 392, 426/522, 548, 565, 580, 586, 587, 588, 426/590, 805, 89, 96
 See application file for complete search history.

(56) References Cited

U.S. PATENT DOCUMENTS

| | | | |
|---|---|---|---|
| 6,001,404 A | * | 12/1999 | Mochizuki ............... A23G 3/26 426/100 |
| 8,479,352 B2 | | 7/2013 | Cocchi et al. |
| 8,479,532 B2 | * | 7/2013 | Cocchi ..................... A23G 9/04 62/342 |
| 2005/0029174 A1 | * | 2/2005 | Collins .............. B01D 21/0009 210/143 |
| 2005/0081554 A1 | * | 4/2005 | Ross ........................ A23G 9/12 62/342 |
| 2006/0283196 A1 | * | 12/2006 | Rosenbaum ............. A23D 7/05 62/63 |
| 2009/0193828 A1 | * | 8/2009 | Cocchi ..................... A23G 9/22 62/222 |
| 2011/0108569 A1 | * | 5/2011 | Jones ....................... A23G 9/22 222/1 |
| 2012/0049770 A1 | | 3/2012 | Bouchez et al. |
| 2012/0215361 A1 | | 8/2012 | Bravo |
| 2013/0129885 A1 | * | 5/2013 | Doglioni Majer .... A47J 31/002 426/431 |
| 2013/0147431 A1 | | 6/2013 | Lim et al. |

FOREIGN PATENT DOCUMENTS

| | | |
|---|---|---|
| CN | 103166278 A | 6/2013 |
| EP | 2082649 A2 | 7/2009 |
| EP | 2783574 A1 | 10/2014 |
| FR | 2731877 A1 | 9/1996 |
| JP | 2002-176924 A | 6/2002 |
| JP | 2012-257153 A | 12/2012 |
| WO | WO2011057692 A1 | 5/2011 |

OTHER PUBLICATIONS

European Search Report dated Apr. 28, 2016 from counterpart European App No. 15193773.7.
Chinese Office Action dated Jan. 8, 2019 for counterpart Chinese Application No. 201511035791.2.
Japanese Office Action dated Jan. 7, 2020 for counterpart Japanese Application No. 2015231472.

* cited by examiner

MACHINE FOR MAKING LIQUID OR SEMI-LIQUID PRODUCTS EQUIPPED WITH FIELDBUS CONTROLLED INVERTER

This application claims priority to Italian Patent Application IT BO2014A000670 filed Nov. 28, 2014, the entirety of which is incorporated by reference herein.

BACKGROUND OF THE INVENTION

This invention relates to a machine for making liquid or semi-liquid products.

As is known, a need felt particularly strongly in the sector concerned is that of controlling precisely and exactly the process for the production of the liquid or semi-liquid products.

Prior art machines for making liquid or semi-liquid products substantially comprise a container for processing the basic liquid or semi-liquid material and a mixer operating inside the container and driven by a motor.

These machines also comprise a control unit designed to control the motor.

Patent document EP2082649 in the name of this Applicant describes a machine for liquid or semi-liquid products where the microprocessor control unit operates, by means of a communication fieldbus, on an inverter connected to the motor in order to drive the mixer.

Patent document US2012/0215361 in the name of G.S.G Srl, filed after publication of the preceding document, describes a machine for making liquid and semi-liquid products and equipped with a processing basin in which a mixer is mounted.

The mixer is driven by a motor which is in turn controlled by an inverter by means of a communication bus.

The control unit sends commands to the inverter requesting the state of the inverter at predetermined intervals, by means of a timer or, alternatively, based on predetermined events, and also sends to the inverter commands based on the instantaneous state of the inverter.

SUMMARY OF THE INVENTION

The aim of this invention is to provide a machine for processing liquid and semi-liquid products allowing the main process parameters to be controlled in a particularly accurate, reliable and easy way and constituting an alternative to prior art systems.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a non-limiting example embodiment of the invention and in which:

DESCRIPTION OF THE PREFERRED EMBODIMENTS

Figure 1:
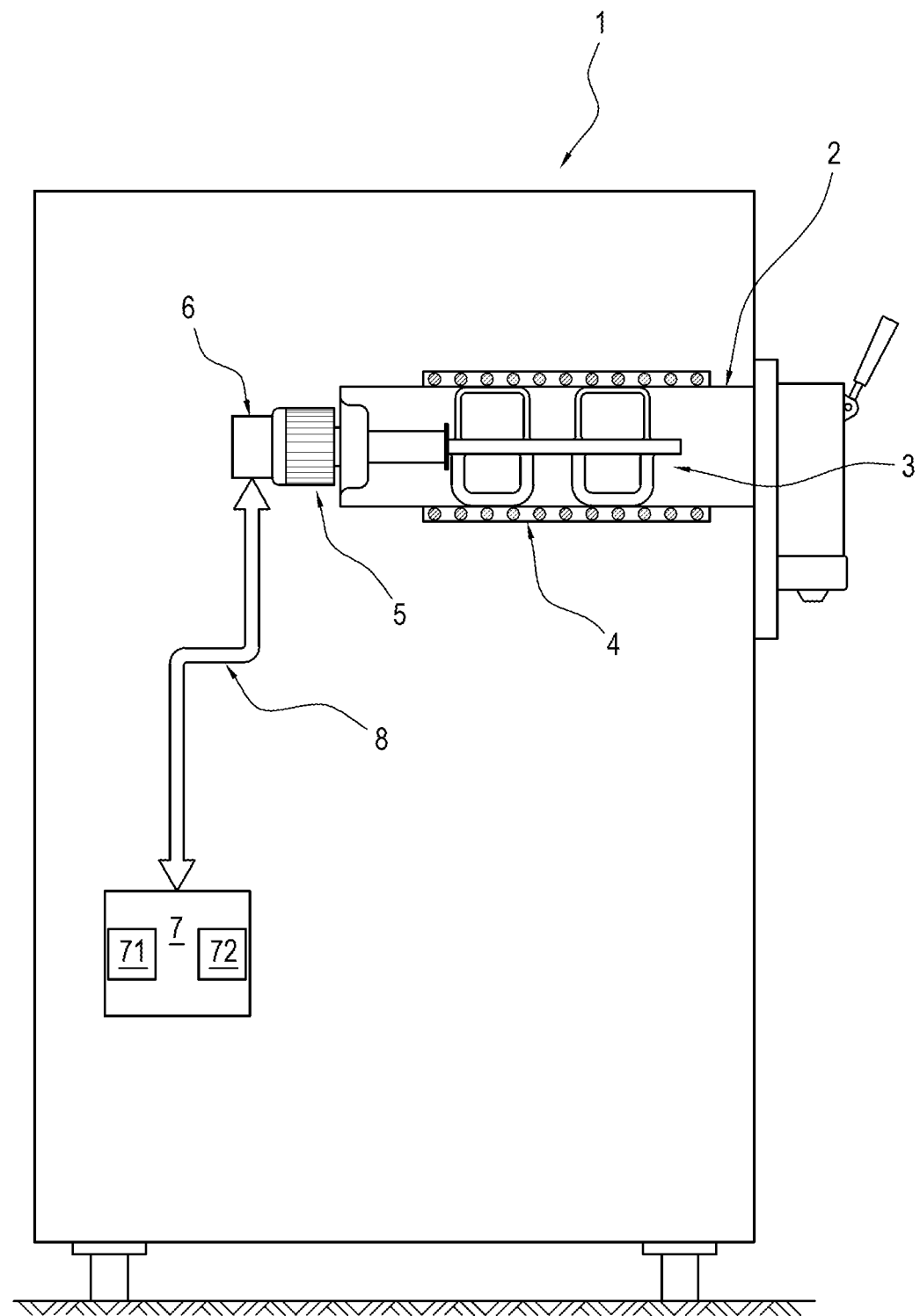
FIG. 1 is a schematic view of a machine of this invention for making liquid or semiliquid products.

In the accompanying drawings, the numeral 1 denotes a machine for making liquid and semi-liquid products, comprising:

a container 2 for processing the liquid and semi-liquid products;

a mixer 3 operating inside the processing container 2;

a heat exchanger 4, operatively associated with the processing container 2 for exchanging heat with the liquid or semi-liquid product inside the container 2;

a motor unit 5 operating on the mixer 3 for driving it in rotation inside the container 2;

an inverter 6, connected to the motor unit 5 for controlling the operation of the motor unit 5;

a control and operating unit 7 (hereinafter also called "control unit"), connected to the inverter 6 for sending command signals S1 and receiving control signals S2, a communication fieldbus 8 interposed between the inverter 6 and the control unit 7 for allowing the transmission of the command and control signals S1,S2 between the inverter 6 and the control unit 7.

Preferably, the communication fieldbus 8 is a serial bus and, still more preferably, a Modbus.

With reference to the processing container 2, preferably the container 2 is a cylindrical container.

Preferably, the container 2 is axisymmetric.

Preferably, the container 2 has a horizontal axis.

With reference to the heat exchanger 4, it should be noted that the machine preferably comprises a thermodynamic system whose operation is based on a heat carrier fluid and the heat exchanger 4 is configured to have the heat carrier fluid flowing through it.

The exchanger 4 forms part of the thermodynamic system.

Preferably, the thermodynamic system comprises a compressor (not illustrated).

With reference to the mixer 3, it should be noted that the mixer has one or more blades, or scraping elements (which extend radially from a central shaft).

Preferably, the mixer 3 is configured to allow scraping the inside walls of the container 2.

With reference to the heat exchanger 4, it should be noted that the heat exchanger 4 is provided with a flow circuit for heat carrier (heat exchange) fluid.

FIG. 1 shows a first embodiment of the machine 1, where the container 2 is a processing (mixing and freezing) cylinder.

Figure 2:
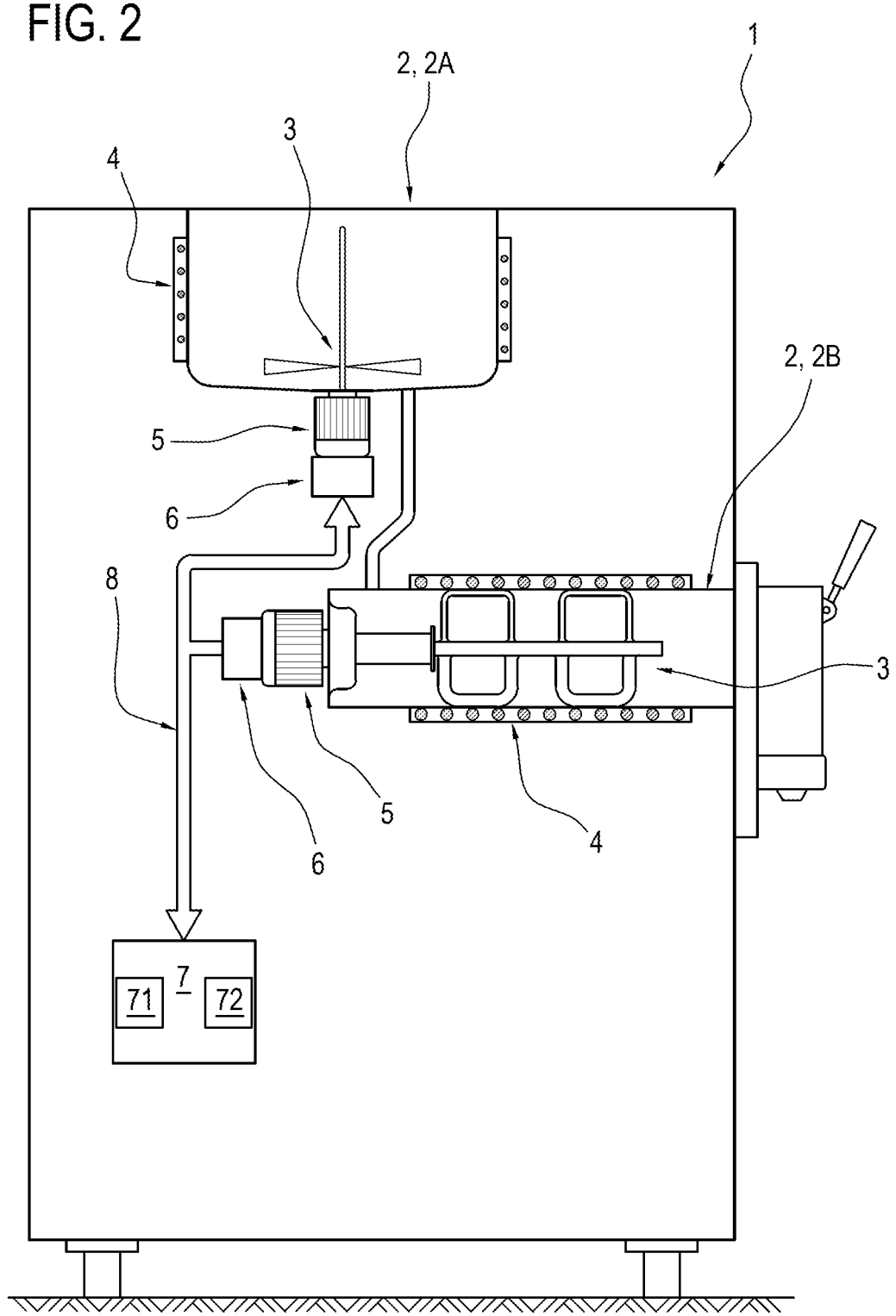
FIG. 2 is a schematic view of a machine of this invention for making liquid or semiliquid products.

FIG. 2 shows a machine 1 provided with a tank 2A for pre-treating the product (defining a first container 2) and a cylinder 2B for processing the product (defining a second container 2).

The machine of FIG. 2 thus comprises a first motor and a first inverter for driving a first mixer operating in the first container 2A and a second motor and a second inverter for driving a second mixer operating in the second container 2B.

The control unit 7 is connected (by means of a single fieldbus or two fieldbuses 8) to the first and second inverters.

Preferably, the control unit 7 is connected to the first and second inverters by means of the same fieldbus 8 (in this case, each inverter has a unique identification ID used by the control unit to send transmission or request commands to the inverter).

Preferably, but not necessarily, the machine 1 is a machine for making ice cream (artisan and/or soft ice cream). More in general, the machine 1 can make any kind of liquid and/or semi-liquid product (for example, yogurt, chocolate, sorbets, creams and the like).

According to the invention, the control unit 7 is programmed to run a first algorithm of the (finite) state machine type, for controlling the inverter.

In other words, the machine 1 (in particular, the control unit 7) comprises a hardware module (comprising one or more processors) and software instructions to be carried out by the hardware module and configured to run a first algorithm of the (finite) state machine type, for controlling the inverter.

The state control algorithm comprises at least the following states:
a) transmission of at least one command to the inverter;
b) standby for confirmation that the inverter received the command;
c) transmission of a read request for an inverter operating parameter;
d) standby for receiving the inverter parameter.

With reference to step a), it should be noted that the command transmitted to the inverter is one (or more) of the following: a start command for the motor unit, a stop command for the motor unit, a rotation frequency setting for the motor, an alarms zeroing.

The motor start command allows starting the motor, and hence the mixer 3.

The motor stop command allows stopping the motor, and hence the mixer 3.

The rotation frequency setting command allows setting the rotation frequency on the inverter 6.

It should be noted that following receipt of the start and stop command by the inverter 6, the motor is actively managed and controlled by the inverter, without the control unit in any way controlling the motor drive parameters (for example, acceleration, deceleration) and the motor is thus controlled independently of the control unit, that is to say, solely by the operating logic implemented in the inverter.

Preferably, the rotation frequency is a number belonging to a discrete set of values. Preferably, the rotation frequency is a value between 0, a first value, a second value and a third value.

The alarm zeroing command allows zeroing the alarms, if any, in the inverter registers.

It should be noted that the commands consist substantially of sending a request to write in one or more inverter registers.

It should also be noted, therefore, that the control unit 7 can send one or more commands simultaneously.

It should be noted that the first algorithm is run cyclically.

Thus, the commands from the inverter card are not sent according to a predetermined time scheme (for example at predetermined intervals) nor on the basis of events but are sent when the algorithm is in a specific state, in particular in the "transmission of command to the inverter" state.

Figure 3:
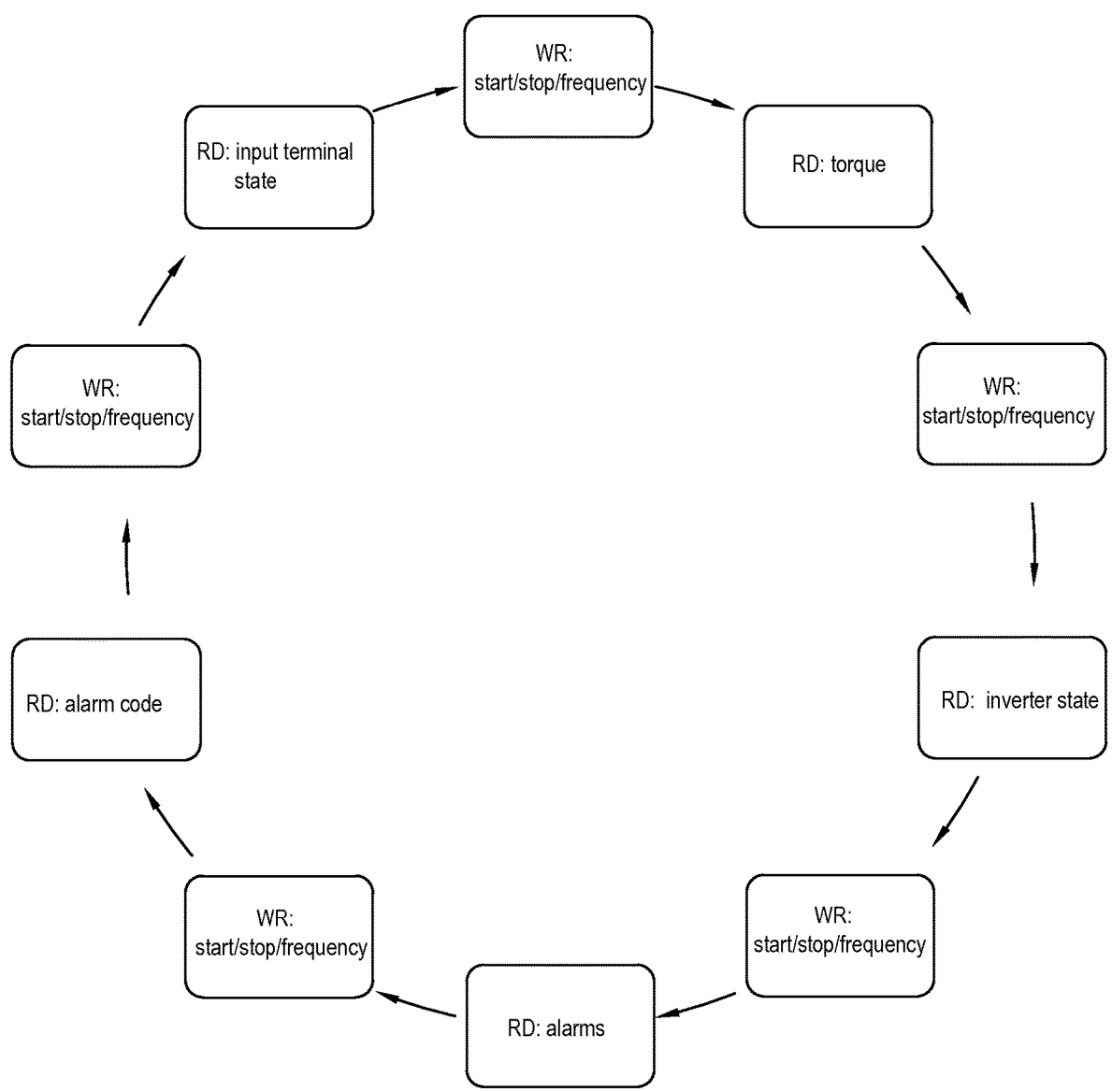
FIG. 3 schematically represents an algorithm implemented in the machine of the invention.

FIG. 3 schematically illustrates how the commands and read requests are sent by the control unit 7 to the inverter 6.

It should be noted that the commands, like the read requests, are sent according to a cyclic scheme, that is to say, cyclically.

More specifically, during normal operation (that is, when there are no alarms or drive variations from the inverter), the first algorithm cyclically and alternately sends a command and a request to read an inverter operating parameter (as illustrated in FIG. 3).

Preferably, the command sent at each cycle is the same, whilst the requests to read an inverter operating parameter are different at each cycle (as shown in FIG. 3, where the read requests are labelled RD, and the commands WR).

The requests to read inverter operating parameters are sent by the control unit to the inverter when the algorithm is in the "transmission of a read request for an inverter operating parameter" state.

It should be noted that to all intents and purposes, the first algorithm thus defines a state machine which cyclically and iteratively sends commands and read requests to the inverter.

It should also be noted that the first algorithm is run substantially continuously from the moment the machine is started.

The digital data sent through the bus 8 relates only to commands for operation of the inverter and not to other signals from different sensors (temperature, pressure) which reach the control unit 7 through communication lines other than the communication bus 8.

In other words, the communication bus 8 is dedicated solely to the transmission of data relating to commands and parameter read requests. With reference to another aspect, it should be noted that the control and operating unit 7 is configured to run (preferably in parallel) a second algorithm of the state machine type, independent of the first algorithm, and configured to control one or more machine actuators, including the thermodynamic system (in particular the compressor of the thermodynamic system).

It should be noted that the second algorithm is responsible for managing the progress of the process, while the first algorithm is substantially responsible for communication and control of the inverter 6 during processing.

The second algorithm is configured to:
a) read the parameters of the step to be performed (from a first data structure and/or from a second data structure described below);
b) command actuators as a function of the parameters read;
c) increment the step counter.

Thus, the progress of the process is not controlled by the first algorithm but is controlled independently and separately by the second algorithm.

Every recipe (for making a product) is made up of steps (phases). It should be noted that at each step, the second algorithm performs the aforementioned operations a) to c) until the last step is reached.

According to another aspect, the machine 1 comprises a memory 71—preferably ROM, or read-only memory—provided with a first data structure.

The first data structure is an information set for different phases of each recipe.

It should be noted that the algorithm preferably reads the data structure at the start, and only at the start, of each phase of the process.

It should be noted that the data retrieved, that is, read, from the data structure is memorized in global variables so as to be accessible both to the first and the second algorithm (which, to all intents and purposes, are independent).

Based on this reading, the first algorithm sets the initial command to be sent to the inverter 6.

During the performance of the specific phase associated with the recipe, the data in the data structure is not read again or compared with the data of the data structure.

In other words, at the start of each phase, the second algorithm reads the data structure in order to retrieve from the data structure itself the information relating to commands to be performed during that phase and/or operating parameters of the machine 1.

The second algorithm is thus configured to read from the data structure—at the start of each phase—the information set for that phase, present in the data structure, in order to set the command to be transmitted to the inverter based on the information retrieved from the data structure.

More precisely, the data structure comprises at least the following information for each recipe and phase:

function (command) to be executed;
ingredient to be displayed;
desired inverter speed;
inverter minimum command speed settable;
inverter maximum command speed settable;
phase execution time;
minimum time settable;
maximum time settable;
desired product temperature;
product minimum temperature settable;
product maximum temperature settable;
control temperature limits.

Preferably, the machine 1 comprises a first data structure, embodied by a ROM, which contains the programming values (factory set), and a second data structure, embodied by a second, different memory 72 which is non-volatile (writable) and which contains the user-settable values.

Preferably, but not necessarily, the second data structure has a structure identical to the first data structure.

At the start of each phase, the algorithm retrieves information items both from the first and the second data structure.

With reference to the function to be executed (information item present in the data structure), the function is preferably one of the following:
heating;
cooling;
heating and stirring;
cooling and stirring;
stirring;
product storage;
product ready.

It should be noted that in the heating function, the control unit 7 (more precisely, the second algorithm) activates a heater associated with the container 2 to heat the product inside the container 2 (the heater may be the selfsame heat exchanger 4).

On the other hand, in the cooling function, the control unit 7 (more precisely, the second algorithm) activates a cooling element associated with the container 2 to cool the product inside the container 2 (the cooling element may be the selfsame heat exchanger 4).

In the "heating and stirring", "cooling and stirring" and "stirring" functions, the control unit 7 commands the inverter 6 to activate the motor 5.

Preferably, the heater and the cooling element are defined by the exchanger 4 or by two different exchangers).

The first algorithm is preferably configured to transmit—in the "transmission of a command to the inverter" state—a motor stop command, or a zero speed motor start command, associated with the "product storage" or "product ready" functions, corresponding to a condition of termination of preparation of the recipe.

Preferably, the machine 1 comprises a user interface (not illustrated) provided with controls and configured to adjust one or more parameters of the command transmitted to the inverter.

Preferably, the interface allows modifying and saving to the data structure some of the values of the second data structure.

According to another aspect, the interface is provided with controls for adjusting the speed of rotation of the inverter, for allowing adjustment of the speed of rotation of the inverter.

Advantageously, therefore, the user can make a variegated product by adjusting the speed of rotation of the inverter as required.

Advantageously, the machine 1 is highly reliable in its operation and particularly easy to control.

The two state algorithms described above, in combination and independently, allow keeping machine operation under control in a particularly safe and reliable manner.

With reference to the "transmission of a read request for an inverter operating parameter" state, it should be noted that the control unit 7 reads the following operating parameters:
the rotation torque of the motor;
the state of logical inputs present at the inverter (these inputs may have external safety devices associated with them);
the state of the alarms (alarm register and alarm code register).

With reference to alarm management, it should be noted that alarm management is performed within the first algorithm.

What is claimed is:

1. A machine for making liquid and semi-liquid products, comprising:
   a processing container for processing the liquid and semi-liquid products;
   a mixer operating inside the processing container;
   a thermodynamic system comprising a heat exchanger, operatively associated with the processing container for exchanging heat with the liquid or semi-liquid product inside the processing container;
   a motor unit operating on the mixer for driving the mixer in rotation inside the processing container;
   an inverter, connected to the motor unit for controlling operation of the motor unit;
   a control and operating unit, including at least one processor, connected to the inverter,
   the control and operating unit including programming of a first algorithm loaded in the control and operating unit to command and control the inverter, the first algorithm defining the following states of the control and operating unit:
   transmission of a command to the inverter;
   standby for confirmation that the inverter received the command;
   transmission of a read request for an inverter operating parameter;
   standby for receiving the inverter parameter;
   wherein the control and operating unit further includes programming of a second algorithm, independent from the first algorithm, to control the thermodynamic system and a process for making liquid and semi-liquid products;
   a first memory provided with a first data structure representing a factory set data set for different phases of each recipe;
   a second memory and a second data structure, the second data structure being specular to the first data structure and containing a user set data set to be entered and modified by a user relating to the different phases of each recipe;
   wherein the control and operating unit is configured to cyclically transmit to the inverter the command and the read request, when there are no drive variations from the inverter, wherein the command being the same for every cycle and the read request being different from one cycle to the next; and
   transmit a motor stop command, or a zero speed motor start command, associated with the product storage or product ready functions, corresponding to a condition of termination of preparation of each recipe, via the first algorithm;

the control and operating unit further configured to read at a start of each of the different phases of each recipe, the data sets relating to the specific phase to be executed from the first and second data structures, setting the initial command to be transmitted to the inverter, and control the thermodynamic system and the process for making liquid and semi-liquid products based on the data sets read from the first and second data structures, via the second algorithm;

a communication bus which is dedicated solely to transmission of data relating to commands and parameter read requests;

wherein the control and operating unit is configured to run the first algorithm continuously from a moment the machine is started.

2. The machine according to claim 1, wherein the command transmitted to the inverter is at least one chosen from: a start command for the motor unit, a stop command for the motor unit, a rotation frequency setting for the motor unit, and an alarms zeroing.

3. The machine according to claim 1, wherein the first data structure comprises, for each recipe and phase, at least the following data:

function to be executed;
phase execution time;
desired product temperature;
desired inverter speed.

4. The machine according to claim 3, wherein the first data structure further comprises the following data:

ingredient to be displayed;
inverter minimum command speed settable;
inverter maximum command speed settable;
minimum time settable;
maximum time settable;
product minimum temperature settable;
product maximum temperature settable;
control temperature limits.

5. The machine according to claim 3, wherein the function to be executed comprises the following values:

heating;
cooling;
heating and stirring;
cooling and stirring;
stirring;
product storage;
product ready.

6. The machine according to claim 1, comprising a user interface, provided with controls for adjusting a speed of rotation of the inverter, for allowing adjustment of the speed of rotation of the inverter.

7. The machine according to claim 1, wherein the control and operating unit is configured to send to the inverter, in the "transmission of a read request for an inverter operating parameter" state of the first algorithm, a read request for reading the following operating parameters:

a rotation torque of the motor unit;
a state of logic inputs present on the inverter;
a state of alarms.

8. The machine according to claim 1, wherein the second algorithm is configured to:

a) read parameters from the first data structure at the start of a step;
b) command actuators as a function of the parameters read;
c) increment a step counter.

* * * * *